United States Patent
Goldstein et al.

(10) Patent No.: US 8,037,365 B2
(45) Date of Patent: Oct. 11, 2011

(54) SYSTEM AND METHOD FOR AUTOMATED AND ADAPTIVE THRESHOLD SETTING TO SEPARATELY CONTROL FALSE POSITIVE AND FALSE NEGATIVE PERFORMANCE PREDICTION ERRORS

(75) Inventors: Maayan Goldstein, Haifa (IL); David Breitgand, Haifa (IL); John Michael Lake, Cary, NC (US); Ealan Abraham Henis, Rehovot, IL (US); Onn Shehory, Haifa (IL)

(73) Assignee: International Busniss Machines coporation, Armonk, NY (US)

( * ) Notice: Subject to any disclaimer, the term of this patent is extended or adjusted under 35 U.S.C. 154(b) by 155 days.

(21) Appl. No.: 12/611,134

(22) Filed: Nov. 3, 2009

(65) Prior Publication Data

US 2011/0107154 A1 May 5, 2011

(51) Int. Cl.
   *G06F 11/00* (2006.01)
(52) U.S. Cl. .................................. 714/47.2
(58) Field of Classification Search ............ 714/2, 3,
   714/30, 31, 33, 37, 38.1, 39, 40, 43–46, 47.1,
   714/47.2, 47.3, 48, 51, 57
   See application file for complete search history.

(56) References Cited

U.S. PATENT DOCUMENTS

| | | | | |
|---|---|---|---|---|
| 6,823,382 B2* | 11/2004 | Stone | ............................. | 709/224 |
| 7,552,171 B2* | 6/2009 | Chidambaran et al. | ........ | 709/203 |
| 2002/0077792 A1* | 6/2002 | Qiu | ................................... | 703/2 |
| 2003/0036886 A1* | 2/2003 | Stone | ........................... | 702/188 |
| 2003/0149570 A1* | 8/2003 | Qiu | ................................... | 705/1 |
| 2004/0088400 A1* | 5/2004 | Daggett | ........................ | 709/224 |
| 2004/0088606 A1* | 5/2004 | Robison et al. | ................. | 714/47 |
| 2006/0168199 A1* | 7/2006 | Chagoly et al. | ................ | 709/224 |
| 2006/0276995 A1* | 12/2006 | Breitgand et al. | ............ | 702/179 |
| 2007/0226631 A1* | 9/2007 | Tevis | ............................ | 715/736 |
| 2008/0103847 A1* | 5/2008 | Sayal et al. | ....................... | 705/7 |

* cited by examiner

*Primary Examiner* — Nadeem Iqbal

(57) ABSTRACT

Managing a computer system including automatically adjusting two separate component thresholds (a component threshold pair) based on a statistical model. Specifically, a first component threshold is modeled to predict violations of an SLO based on a violation of the first component threshold and a second, separate component threshold is modeled to predict a non-violation (compliance) of an SLO based on a non-violation of the second component threshold. Over time, the values of the component thresholds may change and one component threshold may be greater than the other component threshold at one time, and vice versa at another time. A component metric reading between the first and second component thresholds indicates that a prediction of an SLO violation or compliance is less certain, and a warning may be issued rather than an alert.

21 Claims, 3 Drawing Sheets

SYSTEM AND METHOD FOR AUTOMATED AND ADAPTIVE THRESHOLD SETTING TO SEPARATELY CONTROL FALSE POSITIVE AND FALSE NEGATIVE PERFORMANCE PREDICTION ERRORS

FIELD OF THE INVENTION

The present invention relates generally to computer system management, and particularly to methods and systems for automated setting of system component performance thresholds.

BACKGROUND

Computer systems commonly use performance thresholds for monitoring and managing the performance of system components. Threshold violations are recorded and analyzed as possible indicators of system faults. Methods for setting and managing component performance thresholds (referred to herein as "component thresholds" for brevity) are known in the art. In some applications, it is desirable to correlate component thresholds with service-level performance objectives (SLOs) of the computer system. In some cases, machine learning or data mining techniques are used to model the relationship between component thresholds and SLOs. In other cases, neural networks are used to learn the relationships between measured input values. U.S. Patent Publication No. 2006/0276995, the disclosure which is incorporated herein by reference, presents some of these methods.

The prior methods are limited to automatically adjusting a single component threshold and sending alerts when the component threshold is violated. Based on a correlation between the component threshold and the SLO violation, these alerts are used to signal the prediction of a current or imminent system fault. These prior methods require setting the component threshold at a level so that when that component threshold is violated, the violation predicts accurately that a violation of an SLO would occur. An improvement to prior methods would allow for automatically adjusting a component threshold pair, one signifying the probability of SLO violation and the other signifying the probability of SLO compliance. Using the threshold pair combination allows for representing when the probability of a violation of an SLO is high, medium, or low. When the component is performing between the two levels of the component threshold pair, the probability of SLO violation is medium and a lower priority warning could be sent in place of the alert. The higher priority alert is sent when the upper limit of the component threshold pair is violated. Over time, the values of the thresholds may change: one of the component thresholds may be greater than the other component threshold at one time, and vice versa at another time.

SUMMARY

The present invention provides methods and systems for managing a computer system including automatically adjusting a component threshold pair based on a statistical model.

An aspect of the present invention provides a method for managing a computer system. This method includes the steps of monitoring to determine violations of a performance service level objective of a service running on the computer system at discrete time instances so as to accumulate a time series including violations of the performance service level objective; monitoring to determine violations of a first component threshold of a component of the computer system at discrete time instances so as to accumulate a time series including violations of the first component threshold; monitoring to determine violations of a second component threshold of a component of the computer system at discrete time instances so as to accumulate a time series including violations of the second component threshold; accumulating a time series including values of the first component threshold; accumulating a time series including values of the second component threshold; estimating the performance of the first component threshold and second component threshold; determining whether an update to the first component threshold and second component threshold is required; fitting the time series including the violations of the performance service level objective, the time series including violations of the first component threshold, and the time series including values of the first component threshold using logistic regression; fitting the time series including the violations of the performance service level objective, the time series including violations of the second component threshold, and the time series including values of the second component threshold using logistic regression; evaluating the quality of the fittings; based on the quality of the fittings, automatically adjusting the first component threshold and the second component threshold; and updating the system with an adjusted first component threshold and an adjusted second component threshold.

DETAILED DESCRIPTION OF EXEMPLARY EMBODIMENTS

The present invention provides methods and systems for managing a computer system including automatically adjusting two separate component thresholds (a component threshold pair) based on a statistical model. Specifically, a first component threshold is modeled to predict violations of an SLO based on a violation of the first component threshold and a second, separate component threshold is modeled to predict a non-violation (compliance) of an SLO based on a non-violation of the second component threshold. Over time, the values of the component thresholds may change and one component threshold may be greater than the other component threshold at one time, and vice versa at another time. A component metric reading between the first and second component thresholds indicates that a prediction of an SLO violation or compliance is less certain, and a warning may be issued rather than an alert.

Turning now to the drawings, in which like numerals indicate like elements throughout the figures, exemplary embodiments of the invention are described in detail.

Figure 1:
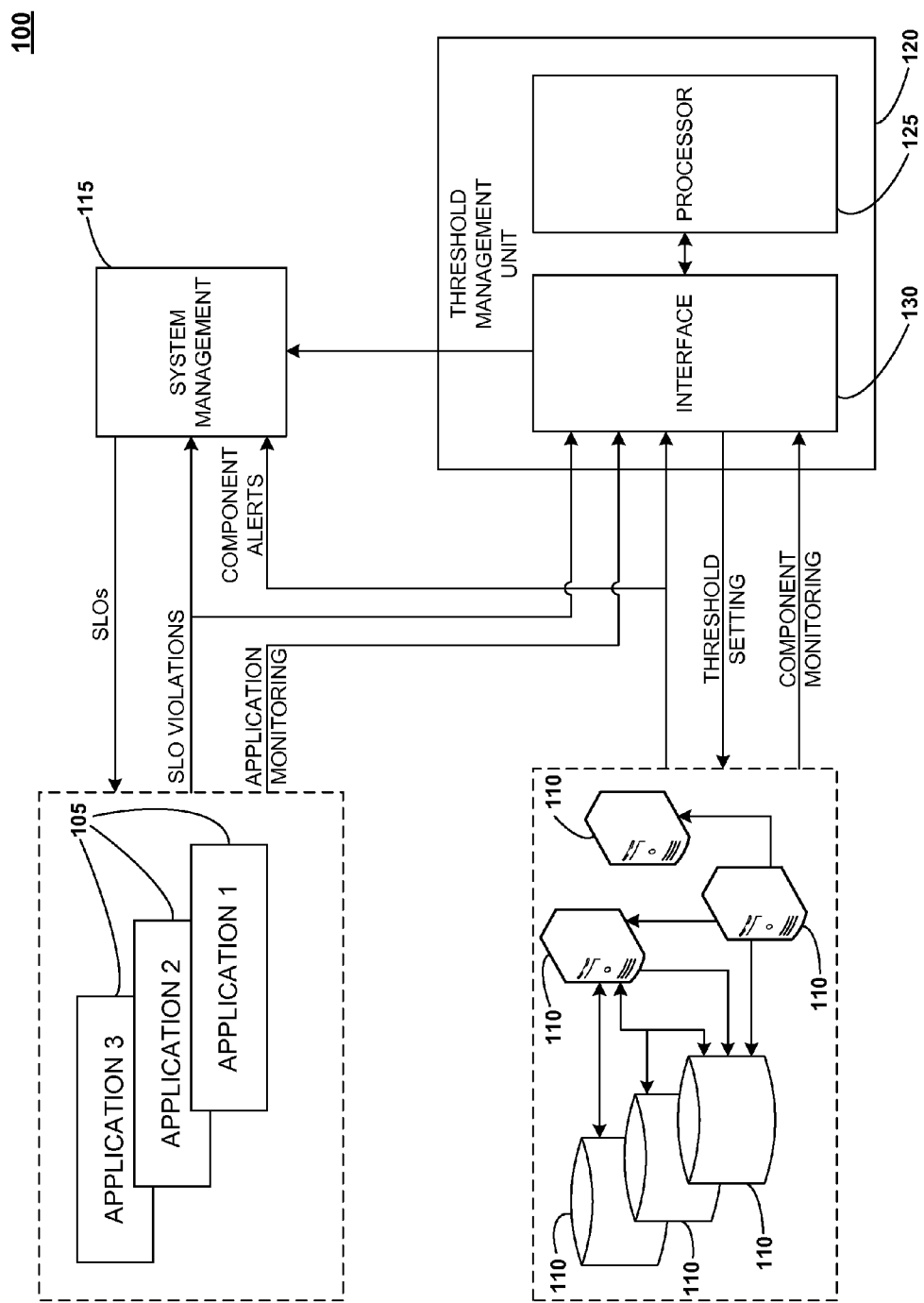
FIG. 1 is a block diagram that schematically illustrates a computer system, in accordance with an exemplary embodiment of the present invention.

FIG. 1 is a block diagram that schematically illustrates a computer system 100, in accordance with an embodiment of the present invention. Referring to FIG. 1, system 100 may include, for example, a storage-area network (SAN) that interconnects multiple servers to multiple storage devices. Alternatively, system 100 can include an enterprise computer system, an electronic business system, a web-site or any other suitable computer system. In some embodiments, system 100 employs autonomous computing and/or self-management methods, as are known in the art. Software applications 105 run on system components 110. Components 110 may include, for example, storage devices such as disks or tapes, disk arrays and their controllers, computing platforms such as servers, and communication devices such as switches and routers. Components 110 are interconnected using suitable interconnection means, such as a backplane or a local area network (LAN), and communicate with each other and with applications 105 using suitable interfaces.

During the operation of the system 100, some of system components 110 monitor their performance in order to detect abnormal behavior and identify potential problems and malfunctions. In some embodiments, the performance of some system components 110 may be monitored by external means. Typically, component 110 measures and monitors one or more predefined component performance metrics (referred to herein as "component metrics" for brevity). Component metrics may include, for example, an access time of a disk, or an instantaneous throughput or a latency of a communication device. For each component metric, the system 100 defines a corresponding component threshold, whose value is set using methods that will be described below. Measured metric values that do not violate the threshold are regarded as normal, whereas metric values that violate the threshold are considered abnormal. (In general, for some metrics, e.g., response time, a threshold set over a particular component metric may include an upper limit, while for other metrics, e.g., throughput, a lower limit is set. In the context of the present patent application, the first case is treated as an example. The second case is treated analogously. The term "threshold violation" refers to component metric values that are higher than the threshold for the first case, or to component metric values that are lower than the threshold for the second case, as applicable. A combination of the two cases, for which a middle range is considered ideal, can also be handled by the methods of the present invention.) A threshold violation typically triggers an alert.

Typically, components 110 of system 100 provide and consume services to and from each other. The services are depicted as arrows between the components in FIG. 1. As part of the service definition, components 110 typically have service level agreements (SLAs) defined among them. Part of the SLA is a performance service level objective (SLO), which defines and quantifies the performance level that a particular component guarantees to other components that may consume its services. In some embodiments, the SLO is expressed as a threshold, which is defined over an application metric. A performance service level objective for a storage service may be, for example, "the response time will not exceed 2 seconds." In this example the response time of the service serves as the application metric. For a communication service, an exemplary performance SLO may be "the average offered capacity will exceed 100 Mbps, averaged over 5 second intervals." Other SLOs may refer to reliability levels and other parameters.

The descriptions that follow refer mainly to binary SLOs, which can be either satisfied or violated. Some systems, however, define multi-level SLOs, for example in scenarios in which the client pays for a service in accordance with the service level. The methods described below can easily be generalized to the case of multi-level SLOs.

In many practical cases, the term "service" refers to application-level services, each including multiple "atomic" or lower-level services, provided by multiple components 110.

For example, a storage service may include computational and management services provided by a server, as well as atomic storage services provided by one or more storage devices. From the system's point of view, an application-level service is typically regarded as a single entity having predefined service level objectives. In the context of the present patent application and in the claims, the term "service" refers to both low-level and application-level services. The term "SLO" refers to the corresponding application-level performance SLO. Typically, SLO violations are detected and reported by applications 105 or by their users.

A system management module 115 defines (or is supplied with) the SLOs for the different services. Module 115 monitors the application-level SLO violations reported by applications 105. Module 115 also monitors the alerts triggered by components 110 in response to component threshold violations. Module 115 may collect and analyze data, react upon it, produce reports, interact with a system administrator, or perform any other system management functions. System management module 115 may be implemented as a software process running on one of the servers of system 100 or on a separate computing platform.

A threshold management unit 120 monitors the operation of system components 110 and of applications 105. Unit 120 includes a processor 125 that performs the threshold management functions described herein, and an interface 130 that communicates with the different applications and components of system 100. In particular, the threshold management unit monitors the alerts triggered by components 110 in response to threshold violations, and the SLO violations reported by applications 105. In some cases the threshold management unit monitors the raw component metrics and application metrics as well.

The threshold management unit applies the accumulated information, using methods that will be explained below, to automatically adjust the values set to the component threshold pairs of components 110. Processor 125 typically sends the updated values by way of interface 130 to the respective components and continues to monitor the system performance running with the updated thresholds. In some embodiments, unit 120 can be implemented as an add-on to an existing computer system, using existing component metrics and thresholds.

Typically, threshold management unit 120 includes a general-purpose computer, which is programmed in software to carry out the functions described herein. The software may be downloaded to the computer in electronic form, over a network, for example, or it may alternatively be supplied to the computer on tangible media, such as CD-ROM. Further alternatively, unit 120 may be implemented in dedicated hardware logic, or using a combination of hardware and software elements. The threshold management unit may be a standalone unit or it may alternatively be integrated with other computing platforms of system 100. For example, unit 120 can be implemented as part of system management module 115. Threshold management unit 120 and/or system management module 115 may be implemented as software processes running on one of the servers in system 100. Alternatively, threshold management unit 120 may be external to system 100 and threshold management unit 120 may be used to provide analysis and/or management services to system 100.

In many practical cases, it is desirable to set the component thresholds so that component threshold violations predict SLO violation events. For example, consider a database query service comprising a single performance SLO that states: "The average transaction processing time shall not exceed 2 seconds." Assume that this exemplary database query service uses several components 110, including several disks. For one of these disks, the access time of writing a data page to the disk is defined as a component metric. A component threshold is defined over this metric, so that an alert is triggered if the access time exceeds the upper threshold value of the threshold pair, and a warning is issued if the access time exceeds the lower threshold value of the threshold pair but does not exceed the upper threshold value.

From a computer application's point of view it is desirable that the alert be triggered if, and only if, the disk access time is likely to cause a violation of the SLO. In this invention, a method is described that controls separately SLO violations and SLO compliance by using two separate component thresholds (a component threshold pair). Setting the threshold that controls violation events too low may cause alerts to trigger when the disk access time is still acceptable, from the SLO perspective. This "false alarm" is commonly referred to as a "false positive" event. Setting the threshold that controls compliance (non-violations) too high, on the other hand, may cause the threshold management unit to report compliance (alert not to trigger) when the SLO is violated. This "misdetection" is commonly referred to as a "false negative" event. Both events are typically undesirable. A high rate of false positive events may cause unnecessary alert processing in the system management module, and may result in unnecessary corrective actions, such as component replacements. A high rate of false negative events may cause failure to identify the root cause of the SLO violations, which may result in a degraded service level.

In principle, the automatic threshold setting methods described below tie together the statistical behavior of the application level SLOs and the component level thresholds. Using these methods, the threshold management unit automatically adjusts the component thresholds pair so as to achieve separately predetermined false positive and false negative rates, with respect to the SLO violations.

In some embodiments, the threshold management unit estimates the false positive and false negative rates by jointly monitoring threshold violations (in other words—triggered alerts) and SLO violations. For example, the threshold management unit can maintain the following table that describes the possible relations between threshold violations and SLO violations:

|  | SLO Violated | SLO Satisfied |
| --- | --- | --- |
| Threshold Violated | I | II |
| Threshold Satisfied | III | IV |

In this example, the threshold management unit uses four counters denoted I, II, III and IV to count occurrences of the four possible combinations of SLO/threshold violations, over a given number of monitoring instances. Counter I counts events, in which a threshold violation coincided with an SLO violation. Counter II counts events, in which the threshold was violated but the SLO was not. Counter III counts events in which the SLO was violated but the threshold was not. Finally, counter IV counts events, in which neither the threshold nor the SLO were violated.

The probability that both the SLO and the threshold are both violated (PBV) can be estimated using the counters above. The PBV is defined as PBV=I/(I+II+III+IV). The probability that neither the SLO nor the threshold are violated (PNV) is defined as PNV=IV/(I+II+III+IV).

Many practical systems include multiple component thresholds and multiple SLOs, some of which may be interrelated. Any of these thresholds and SLOs can be satisfied or violated at any given time. In general, a particular SLO can be affected by any number of different component metrics. Similarly, a particular component metric may affect several SLOs in the system. For simplicity of explanation, the method descriptions that follow will assume a single system component 110 denoted "c" having a single component metric denoted "$\mu$." Two component thresholds denoted "$\gamma\_bv$" (for modeling PBV) and "$\gamma\_nv$" (for modeling PNV) are defined over metric "$\mu$." A single SLO is defined for the system, over an application metric denoted "$\rho$."

Generalization of the disclosed methods to computer systems that include multiple SLOs and/or component thresholds is straightforward. Typically, the generalization of the methods involves identifying which of the multiple component metrics affect each SLO. Methods for identifying such interdependencies and identifying component metrics that are of minor importance to a particular SLO, such as dimensionality reduction methods, are known in the art.

In some systems, a particular SLO may not be reliably predicted using any single component threshold. In such cases, there may exist a combination of two or more component metrics, whose joint consideration may predict an SLO violation. This characteristic is referred to as "inseparability." In some embodiments, the threshold management unit may use statistical methods, such as methods used in data mining applications, to determine a linear combination of component metrics that reliably predicts an inseparable SLO.

In other cases, system 100 may include multiple applications that share the system components and services. These applications typically comprise SLOs that should be accommodated simultaneously. In some embodiments, a single statistical model can be used to model the SLO violations of all the applications. Alternatively, each application may include its own model. An intermediate solution is to classify the applications into classes, each class having a separate model. In one embodiment, a "case study" method can be used, as described by Agresti in "Categorical Data Analysis," John Wiley and Sons, Hoboken, New-Jersey, 2002, which is incorporated herein by reference. Using this method, an empirical probability function is developed over time. The probability function predicts, for each component threshold violation, the type of application that may be affected by it. In some embodiments, the SLOs of the affected applications are combined to form a single composite SLO, and the threshold is adjusted in accordance with the composite SLO. In other embodiments, the affected SLOs remain separate, and a threshold value is defined for each SLO. In these embodiments, a vector of thresholds is typically maintained and separate alerts are generated for each application.

The following paragraphs describe a method, carried out by threshold management unit 120, for calculating values of the component threshold pair that best predict the joint violations and joint non-violations of a component and SLO target values. Three basic assumptions are made in the analysis. The first assumption is that the metrics $\mu$ and $\rho$ defined above are stochastically monotonic. Formally, this condition implies that $Pr(\rho1 \leq \rho2 | \mu1 \leq \mu2) > Pr(\rho1 > \rho2 | \mu1 \leq \mu2)$, wherein $Pr(\ )$ denotes a probability function. $\rho1$ and $\rho2$ denote the values of application metric p at times t1 and t2, respectively. $\rho1$ and $\mu2$ denote the values of component performance metric p at the same two time instances. A second assumption is that the SLO and component threshold are indeed interrelated, so that threshold violations are able to predict the SLO violations. For example, Breitgand et al. describe methods for extracting explicit relationships between system performance problems and component metrics in "Root-Cause Analysis of SAN Performance Problems: an I/O Path Affine Search Approach," Proceedings of the Ninth IFIP/IEEE International Symposium on Integrated Network Management, Nice, France, May 2005, which is incorporated herein by reference. A third underlying assumption is that the behavior of the system remains stochastically stationary for sufficiently long periods of time, so that the threshold has a sufficient number of iterations for converging. These three assumptions are typically met in the majority of practical applications.

In the description that follows, a discrete time model is assumed. In other words, the threshold management unit monitors SLO and threshold violations at discrete time instances denoted $\tau=0, 1, \ldots, t$. The method uses the following definitions: $\Gamma(t)=\{\gamma(0), \gamma(1), \ldots, \gamma(t)\}$ denotes a time series of the values of threshold $\gamma$ at time instances $0, 1, \ldots, t$, where $\gamma$ stands for either $\gamma\_bv$ or $\gamma\_nv$. $A(t)=\{a(0), a(1), \ldots, a(t)\}$ denotes a time series of binary stochastic variables describing SLO violations, wherein $a(\tau)=0$ if the SLO is satisfied at time instance $\tau$ and $a(\tau)=1$ if the SLO is violated at time instance $\tau$. $Y(t)=\{y(0), y(1), \ldots, y(t)\}$ denotes a time series of binary stochastic variables describing threshold violations, wherein $y(\tau)=0$ if threshold $\gamma$ is satisfied at time instance $\tau$ and $y(\tau)=1$ if threshold $\gamma$ is violated at time instance $\tau$. There are two such time series $Y(t)$, one corresponding to $\gamma\_bv$ and one corresponding to $\gamma\_nv$. Let $\theta$ and $\phi$ denote the desired PBV (the probability of both the component threshold and SLO are violated) and PNV (the probability that neither the component threshold nor the SLO are violated) probabilities, respectively.

In some embodiments, the threshold management unit adjusts the desired value for threshold pair $\gamma\_bv$ and $\gamma\_nv$ so that the observed joint probabilities of violation PBV and PNV of the system converge over time to the desired values $\theta$ and $\phi$, respectively. Once this condition is satisfied, SLO violation events can be well predicted by component threshold violation events. SLO non-violation events can also be well predicted by component threshold non-violation events.

The disclosed method constructs a statistical predictive model that uses the time series $\Gamma(t)$, $A(t)$, and $Y(t)$. By solving a regression equation, as will be explained below, the model calculates the threshold pair $\gamma\_bv$ and $\gamma\_nv$ (to be used at the next time interval t+1) such that crossing (or not crossing) these thresholds is well correlated with application compliance (or non-compliance) and hence may be used to predict the future value of $a(t+1)$.

Since $Y(t)$ and $A(t)$ are binary variables, conventional linear regression methods are typically unsuitable for fitting these variables. There are, however, several methods known in the art for analyzing and fitting categorical (i.e., discrete) data. For example, a method called "logistic regression" is described in chapter 5, pages 165-197 of the Agresti reference cited above. Logistic regression is used for performing regression analysis of categorical data.

In some embodiments, the threshold management unit uses logistic regression for calculating $\gamma\_bv(t+1)$ and $\gamma\_nv(t+1)$ based on historical values of $Y(t)$, $A(t)$ and $\gamma\_bv$ and $\gamma\_nv$. Alternatively, other methods for fitting categorical data can be used, such as additional methods described in the Agresti reference cited above. In some embodiments, the time series are filtered and/or assigned non-uniform weighting before the fitting process.

Figure 2:
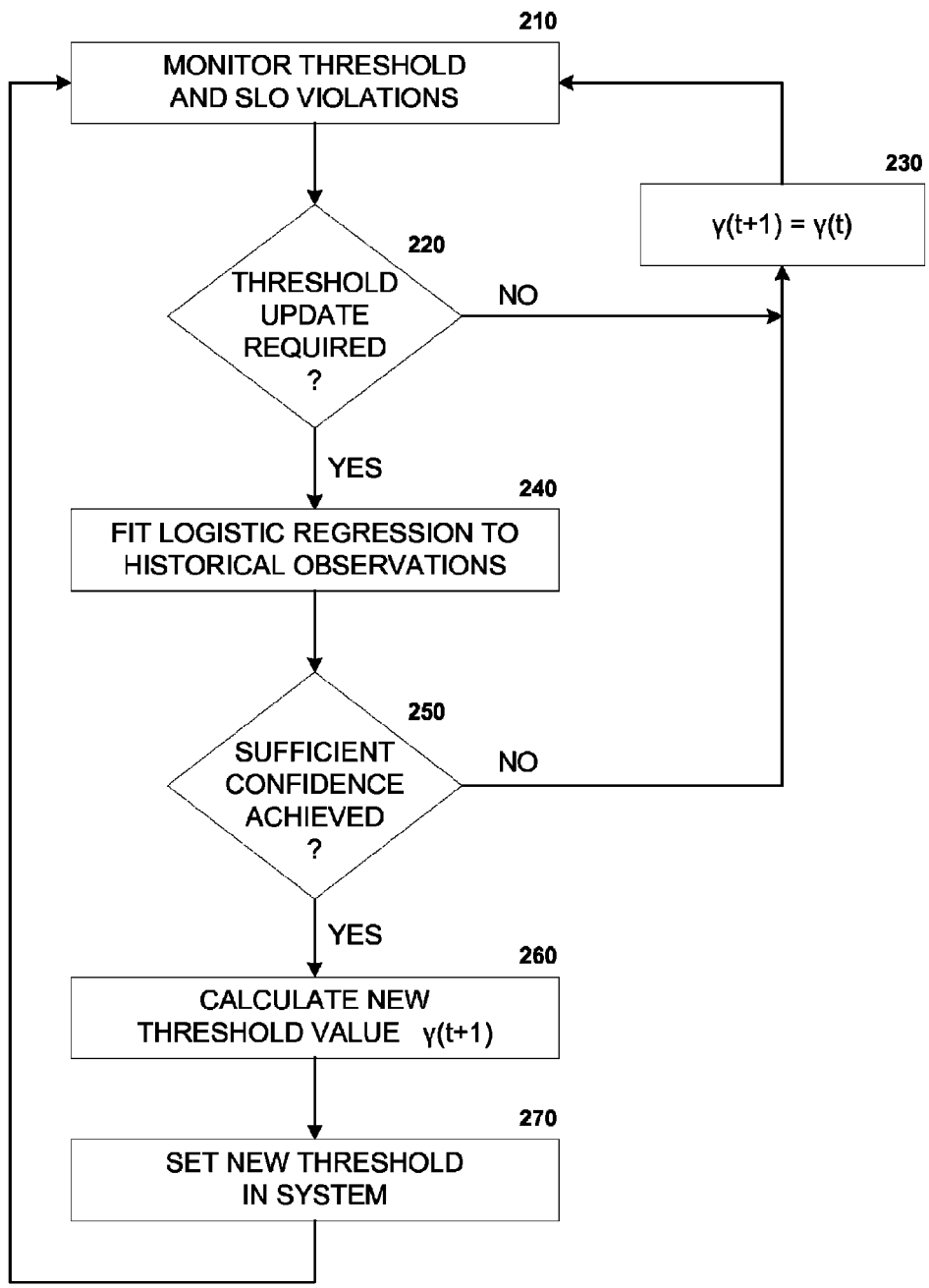
FIG. 2 is a flow chart that schematically illustrates a method for adaptive threshold setting, in accordance with an exemplary embodiment of the present invention.

FIG. 2 is a flow chart that schematically illustrates a method 200 for adaptive threshold setting, carried out by threshold management unit 120, in accordance with an exemplary embodiment of the present invention. Referring to FIGS. 1 and 2, the method 200 begins with unit 120 monitoring the behavior of system 100, at a monitoring step 210. In particular, the threshold management unit monitors component threshold violations, SLO violations, component threshold non-violations, and SLO non-violations and accumulates the measured time series $Y(t)$ and $A(t)$ described above. Unit 120 also records the time series of threshold values $\Gamma(t)$. At the same time, the unit continually estimates the current PBV and PNV performance of thresholds pair $\gamma\_bv$ and $\gamma\_nv$ as described above.

The threshold management unit checks separately whether an update to thresholds $\gamma\_bv$ or $\gamma\_nv$ is required, at an update checking step 220. Several alternative criteria can be used to determine whether a new threshold should be calculated. For example, in some embodiments a new threshold is calculated if the actual PBV or PNV of the threshold, as calculated in step 210 above, deviates from the desired value $\theta$ or $\phi$, respectively. In another embodiment, the threshold management unit decides to update the threshold if a discrepancy is found between SLO and threshold violations (i.e., whenever the threshold is violated when the SLO is satisfied, and vice versa). The threshold management unit can also use different combinations of such criteria. Alternatively, any other suitable criterion can be used. In some cases, two or more such criteria are used in sequence, so as to reduce the computational complexity of update checking step 220.

If the result of update checking step 220 is negative, indicating no update is required for a threshold (calculated separately for each of the thresholds of a threshold pair), the threshold management unit maintains the existing threshold value for the next monitoring interval, at a threshold maintaining step 230. The threshold management unit updates time series $\Gamma(t)$ so that $\gamma\_bv(t+1)=\gamma\_bv(t)$ and $\gamma\_nv(t+1)=\gamma\_nv(t)$. The method 200 then returns to monitoring step 210 and the threshold management unit continues to monitor the system.

If, on the other hand, the outcome of update checking step 220 (performed separately for each threshold in a threshold pair) is positive, indicating a required threshold update, the threshold management unit performs a fitting of the historical time series, using logistic regression, at a fitting step 240. The logistic regression process performed by the unit 120 follows the methods described in chapter 5 of the Agresti reference cited above. Based on the historical time series $Y(t)$, $\Gamma(t)$ and $A(t)$, the threshold management unit estimates for the next time step the probability $$PBV = P(Y=1 \text{ and } A=1 | \vec{X} = \vec{x}) \quad [1]$$

which is the probability that $y(t+1)=1$ and $a(t+1)=1$ (both first threshold and SLO violated at time t+1) given the historical time series $\vec{X}=(\Gamma(t), A(t))$. The threshold management unit also estimates for the next time step, based on the historical time series $Y(t)$, $\Gamma(t)$ and $A(t)$, the probability $$PNV = P(Y=0 \text{ and } A=0 | \vec{X} = \vec{x}) \quad [2]$$

which is the probability that $y(t+1)=0$ and $a(t+1)=0$ (neither second threshold nor SLO violated at time t+1) given the historical time series $\Gamma(t)$ and $A(t)$. $\vec{X}$ denotes the vector of explanatory variables, in the present case comprising $\Gamma(t)$ and $A(t)$. Since $Y(t)$ is a vector of observations of binary stochastic variables, it is typically represented as a vector of 1's and 0's. PBV can thus be estimated by counting the number of 1's in vector $Y(t)$ that occur at the same time as 1's occur in vector $A(t)$ and dividing the result by the length of the vector. Also, PNV can thus be estimated by counting the number of 0's in vector Y(t) that occur at the same time as 0's occur in vector A(t) and dividing the result by the length of the vector.

The processor then calculates the value of the logistic regression function separately for two models $p(\vec{x})$=PBV and $p(\vec{x})$=PNV.

$$logit(p(\vec{x})) = \ln\frac{p(\vec{x})}{1-p(\vec{x})} \quad [3]$$

as defined in the Agresti reference, cited above. Using this relation, the threshold management unit calculates the linear regression between log it($p(\vec{x})$) and $\vec{x}$ for both models of $p(\vec{x})$, given by $$\log it(p(\vec{x})) = c + \vec{b}\cdot\vec{x} \quad [4]$$

The values of regression coefficients c and $\vec{b}$ are derived from the regression calculation, typically using a maximum-likelihood estimation. This process is well known in the art.

After performing the logistic regression, the threshold management unit evaluates the quality of the fit achieved by fitting step 240, at a confidence checking step 250. In one embodiment, the unit uses a double log likelihood (-2LL) test, which is well known in the art. The -2LL test is described, for example, by Kleinbaum and Klein in "Logistic Regression, a Self-Learning Text," Springer Verlag, Second edition, July 2002, chapter 5, page 130. Alternatively, any other suitable method for quantifying the quality of the fit can be used to implement confidence checking step 250. Typically, the quality or confidence of the fit is compared with a predetermined confidence level. If the quality of the fit is insufficient, the method returns to step 230 without changing the two threshold values.

If the quality of the logistic regression fit achieved by fitting step 240 is sufficient, the threshold management unit uses this fit to calculate an updated value for threshold $\gamma=\gamma\_bv(t+1)$ and $\gamma=\gamma\_nv(t+1)$, at a threshold calculation step 260. Equation [4] above can be written as $$p(\vec{x}) = \frac{1}{1 + e^{(-c-\vec{b}\cdot\vec{x})}} \quad [5]$$

Equation [5] can be rewritten for the PBV case as $$p(t+1) = \frac{1}{1 + e^{(-c-a\_bv(t+1)(b_1)-\gamma\_bv(t+1)(b_2))}} \quad [6]$$

where a(t+1) is replaced by a_bv(t+1). The value of a_bv(t+1) can be estimated using one of two alternatives. In one embodiment, the value of a_bv(t+1) may be the mean of A (parameter denoting application level violations), between 0 and 1, in historical runs. This embodiment will produce a threshold that represents the average behavior of the historical sample set. In another embodiment, a_bv(t+1) may be estimated as a_bv(t+1)=1, representing an SLO violation. This embodiment will produce a threshold that will assign more weight to the application violation events. Some value in between the two alternatives is also possible and the users of the algorithm may configure or select a value in between the two alternatives.

Similarly, Equation [5] can be rewritten for the PNV case as $$p(t+1) = \frac{1}{1 + e^{(-c-a\_nv(t+1)(b_1)-\gamma\_nv(t+1)(b_2))}} \quad [7]$$

where a(t+1) is replaced by a_nv(t+1). The value of a_nv(t+1) can be estimated using one of two alternatives. In one embodiment, the value of a_nv(t+1) may be the mean of (1-A) in historical runs. This embodiment will produce a threshold that represents the average behavior of the historical sample set. In another embodiment, a_nv(t+1) may be estimated as a_nv(t+1)=0, representing an SLO non-violation. This embodiment will produce a threshold that will assign more weight to the application non-violation events. Some value in between the two alternatives is also possible and the users of the algorithm may configure or select a value in between the two alternatives.

Given the desired joint probabilities values $\theta$ and $\phi$ and setting $\theta=p(t+1)$, the value of threshold $\gamma\_bv$ at time t+1 can be calculated by solving Equation [6] for $\gamma\_bv(t+1)$ as follows $$\gamma\_bv(t+1) = \frac{\ln\left(\frac{\theta}{1-\theta}\right) - c - b_1(a\_bv(t+1))}{b_2} \quad [8]$$

Similarly, the value of threshold $\gamma\_nv$ at time t+1 can be calculated by solving Equation [7] for $\gamma\_nv(t+1)$ as follows $$\gamma\_nv(t+1) = \frac{\ln\left(\frac{\varphi}{1-\varphi}\right) - c - b_1(a\_nv(t+1))}{b_2} \quad [9]$$

The threshold management unit thus calculates separately the updated values $\gamma\_bv(t+1)$ and $\gamma\_nv(t+1)$ using Equation [8] and Equation [9], based on the desired PBV and PNV values $\theta$ and $\phi$, respectively, and on the regression coefficients b1, b2 and c, derived separately for each threshold in a threshold pair, by the logistic regression process at fitting step 240.

Having calculated the new thresholds $\gamma\_bv(t+1)$ and $\gamma\_nv(t+1)$, the threshold management unit sets these values in the system, at a threshold setting step 270. The method then loops back to monitoring step 210. The threshold management unit continues to monitor the system, which now operates with the updated threshold pair. In the subsequent iteration of monitoring step 210, the threshold management unit augments time series $\Gamma(t)$, Y(t) and A(t) with the newly-calculated thresholds $\gamma\_bv(t+1)$, $\gamma\_nv(t+1)$, and the new observations of the thresholds and SLO violations, respectively. In the subsequent iteration of fitting step 240, the threshold management unit, for each threshold of the threshold pair, derives new values of c, b1 and b2 using a logistic regression on the updated time series. The process continues iteratively in this manner. Using the iterative threshold setting method described above, the actual PBV and PNV values of the threshold $\gamma\_bv$ and $\gamma\_nv$ with respect to the SLO gradually converge to the desired values $\theta$ and $\phi$, respectively.

As can be seen from equations [8] and [9] above, the value of $\gamma\_bv(t+1)$ implicitly depends on the previous values $\gamma\_bv(0), \gamma\_bv(1), \ldots, \gamma\_bv(t)$ and the value of $\gamma\_nv(t+1)$ implicitly depends on the previous values $\gamma\_nv(0), \gamma\_nv(1), \ldots, \gamma\_nv(t)$. The dependence is carried through the regression coefficients b1, b2 and c, which are derived from the previous iteration of fitting the historical threshold values. In some cases, this dependence may introduce a bias into the regression model, which typically slows its convergence and introduces an error into the resulting threshold values. To overcome this bias effect, in some embodiments the threshold management unit inserts dummy data points into time series Γ(t) before performing fitting step 240. The dummy data points are typically interleaved with the real threshold values. In one embodiment, the dummy values are generated at random, using a uniform distribution, from the range $[\max(\bar{\mu}-3\sigma, 0), (\bar{\mu}+3\sigma)]$, wherein $\bar{\mu}$ denotes the sample mean of metric μ and σ denotes the sample variance of the metric. Other suitable distribution functions can also be used. The introduction of the dummy points into the calculation helps to reduce the bias and improves the model fit.

In some embodiments, some of the data points of time series A(t) and Y(t) are given different weights, in order to improve the fitting accuracy in the logistic regression. For example, data points corresponding to older observations may be given lower weight in comparison to more recent data points. In another exemplary scenario, SLOs and metrics of some systems exhibit periodic behavior corresponding to certain hours in a day or days in a month. Such periodic behavior is described, for example, in the Burgess paper cited above. Assigning weights in accordance with such repetitive patterns can also improve the model fit.

Figure 3:
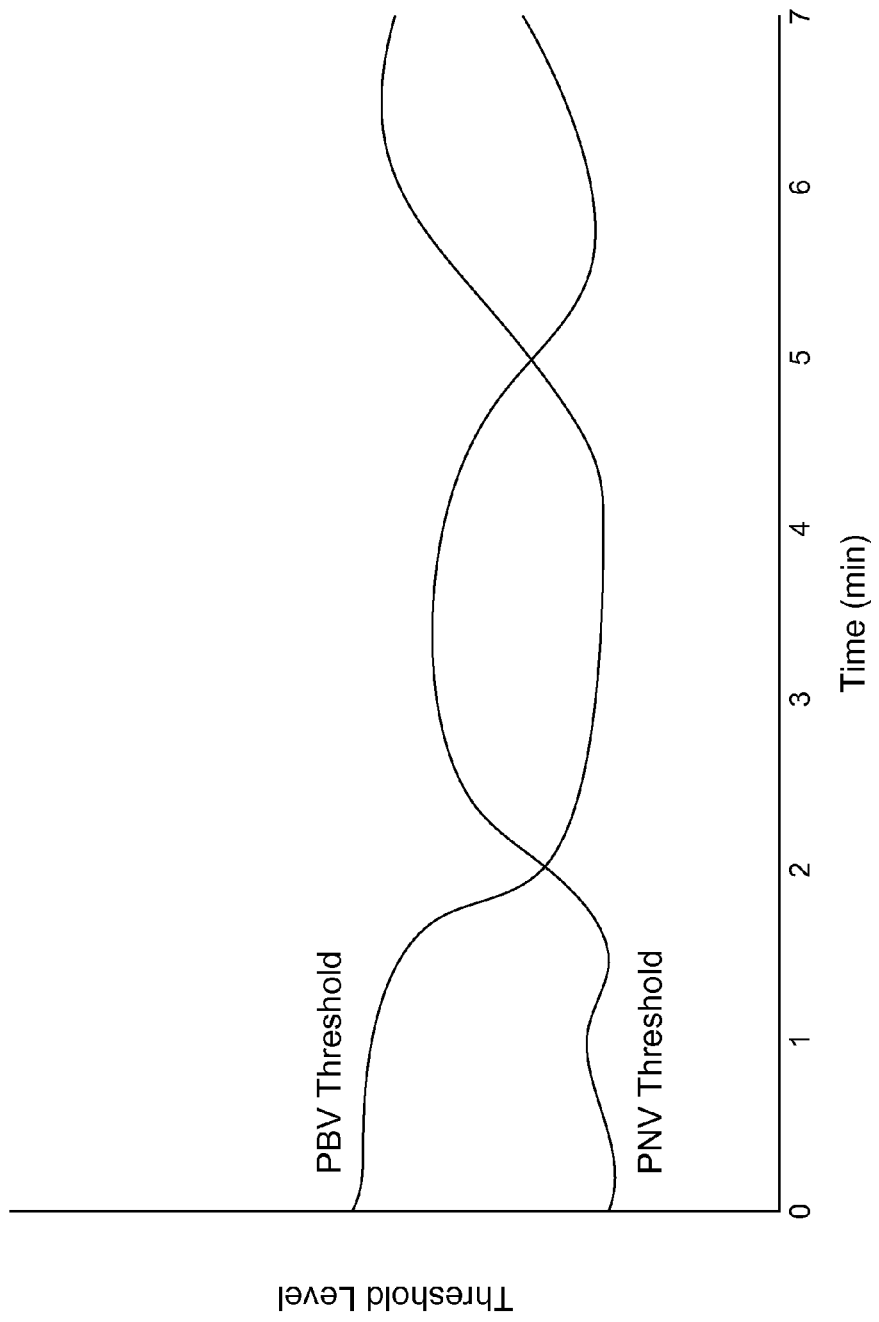
FIG. 3 is a plot that illustrates a component level threshold pair in accordance with an exemplary embodiment of the present invention.

FIG. 3 is a plot 300 that illustrates a component level threshold pair in accordance with an exemplary embodiment of the present invention. FIG. 3 shows the value of the PBV threshold and the value of the PNV threshold plotted over time in minutes. As described above, over time the values of the component thresholds may change and one component threshold may be greater than the other component threshold at one time, and vice versa at another time. Referring to FIG. 3, the value of the PBV threshold and the value of the PNV threshold intersect at time=2 minutes and at time=5 minutes.

One of ordinary skill in the art would appreciate that the present invention provides methods and systems for managing a computer system including automatically adjusting two separate component thresholds (a component threshold pair) based on a statistical model. Specifically, a first component threshold is modeled to predict violations of an SLO based on a violation of the first component threshold, and a second, separate component threshold is modeled to predict a non-violation (compliance) of an SLO based on a non-violation of the second component threshold. Over time, the values of the component thresholds may change and one component threshold may be greater than the other component threshold at one time, and vice versa at another time. A component metric reading between the first and second component thresholds indicates that a prediction of an SLO violation or compliance is less certain, and a warning may be issued rather than an alert.

The embodiments described above used two separate joint probabilities (PBV, PNV) to control the rates of false positive and false negative errors in SLO violation predictions. Other types of separate probability definitions may be used instead, to separately control the two error types. For example, one can use the Positive Predictive Value and Negative Predictive Value pair (standard definition of these predictive values can be found in, e.g., U.S. Patent Publication No. 2006/0276995) instead of the PBV and PNV pair used here. An innovation of this invention is controlling separately each prediction error type via the employment of a threshold pair.

Although the embodiments described above relate, by way of example, to faults in a computer system, the principles of the present invention may similarly be applied to other systems in which component performance is monitored and managed using metrics and thresholds. Such systems may comprise, for example, medical systems, industrial systems, communication systems and others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A method comprising:
    accumulating, by monitoring a computer system having a component associated with first and second threshold values, at specified times
        a service level objective (SLO) violations time series comprising data points that are discrete variables representative of violation or non-violation of an SLO of a service running on the computer system,
        a first threshold violations time series comprising data points that are discrete variables representative of violation or non-violation of the first threshold, and
        a second threshold violations time series comprising data points that are discrete variables representative of violation or non-violation of the second threshold;
    setting, periodically at the specified times, the first threshold values, which comprise data points that are set values of the first threshold and the second threshold values, which comprise data points that are set values of the second threshold;
    evaluating, at one of the specified times, a performance level of the first and the second thresholds, the performance level being associated with a predictability level of future SLO violations by the first and second violations time series in view of the first and the second threshold time series that have been accumulated at the one of the specified times, and repeating the accumulating;
    maintaining the first and the second thresholds values when the performance levels meet a specified value;
    fitting by logistic regression, when the performance levels do not meet the specified value:
        the SLO violations time series, the first threshold violations time series, and the first threshold values time series so as to yield a first threshold fitting, and
        the SLO violations time series, the second threshold violations time series, and the second threshold values time series so as to yield a second threshold fitting;
    setting the first and the second thresholds to respective adjusted first and second thresholds computed in accordance with the first and the second threshold fittings, when the first and the second threshold fittings are statistically sufficient in view of the accumulated first and the second threshold time series; and
    maintaining the first and the second thresholds values, when the fittings are statistically insufficient in view of the accumulated first and the second threshold time series, and repeating the accumulating,
    wherein at least one of the accumulating, the setting, the evaluating, the maintaining, and the fitting is performed by at least one computer.

2. The method according to claim 1, wherein the computer system comprises a Storage Area Network (SAN).

3. The method according to claim 1, wherein the discrete variables being multi-level variables.

4. The method according to claim 1, wherein the discrete variables being binary variables.

5. The method according to claim 1, further comprising adding dummy data points between the data points of at least one time series for enhancing the statistical sufficiency of the fittings.

6. The method according to claim 1, wherein the fitting is applied to specified data points only.

7. The method according to claim 1, wherein the fitting comprises applying weights to at least some of the data such that the weights correspond with at least one of recent events, periodic events, rare events, and events in which the SLO is almost violated and events in which a performance metric value is within a predetermined interval.

8. An apparatus comprising:
a computer interface; and
a processor,
wherein the computer interface is arranged to:
accumulate, by monitoring a computer system having a component associated with first and second threshold values, at specified times
a service level objective (SLO) violations time series comprising data points that are discrete variables representative of violation or non-violation of an SLO of a service running on the computer system,
a first threshold violations time series comprising data points that are discrete variables representative of violation or non-violation of the first threshold, and
a second threshold violations time series comprising data points that are discrete variables representative of violation or non-violation of the second threshold; and
set, periodically at the specified times, the first threshold values, which comprise data points that are set values of the first threshold and the second threshold values, which comprise data points that are set values of the second threshold,
wherein the processor is arranged to:
evaluate, at one of the specified times, a performance level of the first and the second thresholds, the performance level being associated with a predictability level of future SLO violations by the first and second violations time series in view of the first and the second threshold time series that have been accumulated at the one of the specified times, and repeating the accumulating;
maintain the first and the second thresholds values when the performance levels meet a specified value;
fit by logistic regression, when the performance levels do not meet the specified value:
the SLO violations time series, the first threshold violations time series, and the first threshold values time series so as to yield a first threshold fitting, and
the SLO violations time series, the second threshold violations time series, and the second threshold values time series so as to yield a second threshold fitting;
set the first and the second thresholds to respective adjusted first and second thresholds computed in accordance with the first and the second threshold fittings, when the first and the second threshold fittings are statistically sufficient in view of the accumulated first and the second threshold time series; and
maintain the first and the second thresholds values, when the fittings are statistically insufficient in view of the accumulated first and the second threshold time series, and repeating the accumulating.

9. The apparatus according to claim 8, wherein the computer system comprises a Storage Area Network (SAN).

10. The apparatus according to claim 8, wherein the discrete variables being multi-level variables.

11. The apparatus according to claim 8, wherein the discrete variables being binary variables.

12. The apparatus according to claim 8, wherein the processor is further arranged to add dummy data points between the data points of at least one time series for enhancing the statistical sufficiency of the fittings.

13. The apparatus according to claim 8, wherein the processor is arranged to fit specified data points only.

14. The apparatus according to claim 8, wherein the processor is arranged to fit by applying weights to at least some of the data such that the weights correspond with at least one of recent events, periodic events, rare events, and events in which the SLO is almost violated and events in which a performance metric value is within a predetermined interval.

15. A computer program product, the computer program product comprising:
a computer readable storage medium having computer readable program embodied therewith, the computer readable program comprising:
computer readable program configured to accumulate, by monitoring a computer system having a component associated with first and second threshold values, at specified times,
a service level objective (SLO) violations time series comprising data points that are discrete variables representative of violation or non-violation of an SLO of a service running on the computer system,
a first threshold violations time series comprising data points that are discrete variables representative of violation or non-violation of the first threshold, and
a second threshold violations time series comprising data points that are discrete variables representative of violation or non-violation of the second threshold;
computer readable program configured to set, periodically at the specified times, the first threshold values, which comprise data points that are set values of the first threshold and the second threshold values, which comprise data points that are set values of the second threshold;
computer readable program configured to evaluate, at one of the specified times, a performance level of the first and the second thresholds, the performance level being associated with a predictability level of future SLO violations by the first and second violations time series in view of the first and the second threshold time series that have been accumulated at the one of the specified times, and repeating the accumulating;
computer readable program configured to maintain the first and the second thresholds values when the performance levels meet a specified value;
computer readable program configured to fit by logistic regression, when the performance levels do not meet the specified value:
the SLO violations time series, the first threshold violations time series, and the first threshold values time series so as to yield a first threshold fitting, and
the SLO violations time series, the second threshold violations time series, and the second threshold values time series so as to yield a second threshold fitting;

computer readable program configured to set the first and the second thresholds to respective adjusted first and second thresholds computed in accordance with the first and the second threshold fittings, when the first and the second threshold fittings are statistically sufficient in view of the accumulated first and the second threshold time series; and computer readable program configured to maintain the first and the second thresholds values, when the fittings are statistically insufficient in view of the accumulated first and the second threshold time series, and repeating the accumulating.

16. The computer program product according to claim 15, wherein the computer system comprises a Storage Area Network (SAN).

17. The computer program product according to claim 15, wherein the discrete variables being multi-level variables.

18. The computer program product according to claim 15, wherein the discrete variables being binary variables.

19. The computer program product according to claim 15, further comprising computer readable program configured to add dummy data points between the data points of at least one time series for enhancing the statistical sufficiency of the fittings.

20. The computer program product according to claim 15, wherein the fitting is applied to specified data points only.

21. The computer program product according to claim 15, wherein the fitting comprises applying weights to at least some of the data such that the weights correspond with at least one of recent events, periodic events, rare events, and events in which the SLO is almost violated and events in which a performance metric value is within a predetermined interval.

* * * * *